(12) United States Patent
Khatter (10) Patent No.: US 7,558,286 B2
(45) Date of Patent: Jul. 7, 2009

(54) METHOD OF SCHEDULING DATA AND SIGNALING PACKETS FOR PUSH-TO-TALK OVER CELLULAR NETWORKS

(75) Inventor: Saryender Khatter, Jaipur (IN)

(73) Assignee: Sonim Technologies, Inc., San Mateo, CA (US)

( * ) Notice: Subject to any disclaimer, the term of this patent is extended or adjusted under 35 U.S.C. 154(b) by 785 days.

(21) Appl. No.: 11/022,268

(22) Filed: Dec. 24, 2004

(65) Prior Publication Data

US 2006/0088065 A1   Apr. 27, 2006

Related U.S. Application Data

(60) Provisional application No. 60/621,160, filed on Oct. 22, 2004.

(51) Int. Cl.
*H04J 3/16* (2006.01)
*H04B 1/38* (2006.01)

(52) U.S. Cl. ............... 370/468; 455/90.2; 370/528

(58) Field of Classification Search ............. 370/522, 370/528, 468, 498; 455/90.2
See application file for complete search history.

(56) References Cited

U.S. PATENT DOCUMENTS

| | | | | | |
|---|---|---|---|---|---|
| 5,602,835 | A | * | 2/1997 | Seki et al. | 370/206 |
| 5,612,955 | A | * | 3/1997 | Fernandes et al. | 370/433 |
| 5,740,531 | A | * | 4/1998 | Okada | 455/403 |
| 6,434,606 | B1 | * | 8/2002 | Borella et al. | 709/214 |
| 6,658,064 | B1 | * | 12/2003 | Rotola-Pukkila et al. | 375/295 |
| 6,907,030 | B1 | * | 6/2005 | Bladsjö et al. | 370/349 |
| 7,023,813 | B2 | * | 4/2006 | Newberg et al. | 370/312 |
| 7,035,655 | B2 | * | 4/2006 | Maggenti et al. | 455/517 |
| 7,170,863 | B1 | * | 1/2007 | Denman et al. | 370/260 |
| 7,412,541 | B1 | * | 8/2008 | Stadler et al. | 709/247 |
| 2002/0141383 | A1 | * | 10/2002 | Schaefer et al. | 370/352 |
| 2003/0040307 | A1 | * | 2/2003 | Lemieux et al. | 455/425 |
| 2003/0115045 | A1 | * | 6/2003 | Harris et al. | 704/214 |
| 2003/0125910 | A1 | | 7/2003 | Randmaa et al. | |
| 2003/0212550 | A1 | | 11/2003 | Ubale | |
| 2004/0071084 | A1 | * | 4/2004 | El-Hennawey et al. | 370/230 |
| 2004/0223489 | A1 | * | 11/2004 | Rotsten et al. | 370/352 |
| 2004/0224711 | A1 | * | 11/2004 | Panchal et al. | 455/518 |
| 2004/0266418 | A1 | * | 12/2004 | Kotzin | 455/420 |
| 2005/0169223 | A1 | * | 8/2005 | Crocker et al. | 370/342 |
| 2005/0227657 | A1 | * | 10/2005 | Frankkila et al. | 455/255 |
| 2006/0003781 | A1 | * | 1/2006 | Jin et al. | 455/509 |

FOREIGN PATENT DOCUMENTS

WO   WO 2005086404 A1 *   9/2005

OTHER PUBLICATIONS

PCT Int'l Search Report mailed Apr. 12, 2006 in PCT/US05/37531.
PCT Written Opinion mailed Apr. 12, 2006 in PCT/US05/37531.

* cited by examiner

*Primary Examiner*—Seema S. Rao
*Assistant Examiner*—Xavier Szewai Wong
(74) *Attorney, Agent, or Firm*—Kali Law Group, P.C.

(57) ABSTRACT

A method and device for scheduling signaling and data packets during Push-to-talk (PTT) sessions. An exemplary embodiment of the invention includes scheduling data packets and signaling packets during a push-to-talk session by detecting periods of silence in the talk-burst, inserting signaling packets between the data packets in the periods of silence in the talk-burst; and transmitting the signaling data packet along with the data packets. In another aspect of the invention, downlink signaling packets are suspended during the push-to-talk session.

20 Claims, 8 Drawing Sheets

METHOD OF SCHEDULING DATA AND SIGNALING PACKETS FOR PUSH-TO-TALK OVER CELLULAR NETWORKS

RELATED APPLICATIONS

This application claims priority to U.S. Provisional Application No. 60/621,160 filed on Oct. 22, 2004.

FIELD

The present invention relates in general to cellular communication technologies and in particular to a method of scheduling data and signaling packets in a push-to-talk network to maximize talk-burst quality and user experience.

BACKGROUND

Mobile cellular communication is evolving beyond traditional voice telephony towards more sophisticated services, such as Push-To-Talk (PTT). Similar to conventional walkie-talkie communication, PTT enables mobile communication users to send a voice message to one or more recipients over a mobile phone by simply pushing a key (i.e., PTT button, etc.).

One particular version of PTT, called PoC (PTT-over-Cellular), has started to be implemented in wireless data networks such as GSM/GPRS and CDMA cellular networks. By using internet protocols (i.e., an internet protocol network), these networks can provide a packet-based data service that enables information to be sent and received across a mobile telephone network. In addition, the use of internet protocols also facilitates PoC through the use of instant connections. That is, information can be sent or received immediately as the need arises, subject to available time slots at the air interface.

PTT, including PoC-based PTT, is half-duplex. That is, all participants typically use a single frequency or channel for both transmission and reception. Either a participant speaks or listens, but not both. This is in contrast to traditional cellular communication that is full-duplex (e.g., like a regular wired phone), in which at least one channel or frequency is assigned to talk, and another separate one is assigned to listen such that both speaking and listening can occur simultaneously.

For audio/video data transmissions, PoC applications require the transmission of signaling packets using a signaling protocol, e.g., SIP (Session Initiation Protocol), and data packets using a data protocol, e.g., RTP (Real Time Protocol). SIP is a signaling protocol for Internet conferencing, telephony, presence, events notification, and instant messaging. RTP is an Internet-standard protocol for the transport of real-time data, including audio and video media. It can be used for media-on-demand as well as interactive services such as Internet telephony. RTP consists of a data and a control part. The latter is called RTCP.

As bandwidth is always a constraint in wireless applications, transmitting both signaling and data packets is problematic. For example, in a PoC environment, SIP packets generally are larger than RTP packets even after using signaling compression (SigComp). Moreover, different types of SIP packets have different size values as well. On average, a response type SIP packet is between 350 and 400 bytes while a request type packet can range from 1.2 to 1.5 kilobytes.

When a PoC application shares a single PDP (Packet Data Protocol) context for both media and for signaling, SIP signaling packets may be sent during media transmission, which can disturb RTP flow and thus degrade voice quality. Transmitting SIP packets can require significant time, which in turn creates latency of RTP packets. As a result, the receiver then hears choppy speech during the PoC conversation.

Figure 1:
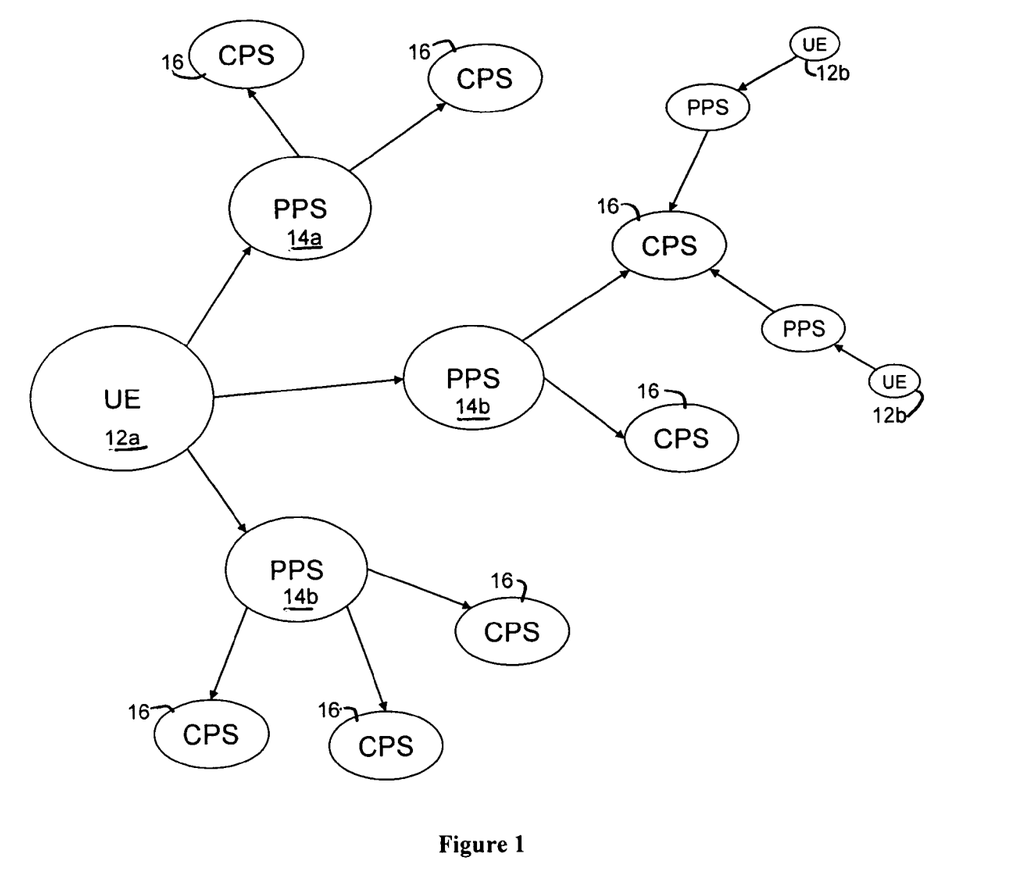
FIG. 1 is a block diagram depicting the universe of components in an expanded PoC communications network.

This problem will be compounded in future PoC applications. In the near future, PoC systems can involve numerous PoC Servers 10 connected to individual handsets and other user associated devices, UE 12. FIG. 1 shows a possible future system of UE 12 connected to multiple PoC Servers 10 (both participating (PPS) 14 and controlling (CPS) 16). The PPS 14 manages the media and signaling that streams from the CPS 16. The CPS 16 provides centralized media distribution and session handling among connected UE 12. The PoC Server 10 may perform a Controlling PoC Function or Participating PoC Function. The Controlling PoC Function and Participating PoC Function are different roles of the PoC Server 10, but a PoC Server 10 may perform both a Controlling PoC function and a Participating PoC function at the same time. As shown in FIG. 2, a UE 12a is connected to one or more PPS 14 which in turn are connected to one or more CPS 16 which provide overall PoC management function for innumerable connected UE 12b.

Problems arise in this system setup because the PoC Servers 10 are not connected to each other. A user can be in a PoC session over one PPS 14a as other PPS 14b are trying to send the UE 12a an Invite request to join another PoC session. Conflicts between data and signal packets can result in poor talk burst quality during an existing PTT session when the new invitation comes in to UE 12a.

Current PoC standards, which call for compression, do not adequately address this problem. PoC may be implemented over a variety of access networks, including GPRS according to 3GPP Release 97/98, EGPRS according to 3GPP Release 99 or later releases, and UMTS according to Release 99 or later releases. For these networks, a PoC implementation preferably follows these recommendations:

The PoC implementation should work in an access network that delivers a throughput of 7.2 kbps or more.

The QoS profile parameters should be set such that the RLC uses an acknowledged mode of operation.

If streaming traffic class is supported by the access network, PoC should use this traffic class for the exchange of RTP/RTCP data.

The POC client should support AMR 5.15 as the mandatory and default codec, with optional support of AMR 4.75 being desirable. The support of any other AMR codec is at design discretion.

The AMR payload format should use the octet-aligned mode (byte aligned) without interleaving and without CRCs.

If traffic class streaming can be supported in the GPRS network, then an interactive traffic class PDP context is preferably used for SIP and HTTP signaling; and a streaming traffic class PDP context is preferably used for the RTP/RTCP packets. If streaming is not available, then either two interactive PDP contexts may be used (one interactive PDP context intended for PoC signaling and one interactive PDP context for RTP media), or a single PDP context may be used for both PoC signaling and RTP media.

In order to ensure optimal service quality for PoC in GPRS networks, the QoS profile parameter values are carefully selected by the UE in PDP context activation requests. Since 3GPP Release 97/98 compliant networks do not provide support for a streaming traffic class, a QoS profile of a single PDP context may be shared between PoC signaling and media flows.

If using a dedicated PDP context for RTP/RTCP media, this context should be set up before or at the time of the first talk session. The RTCP traffic may be transported on the same PDP context as the SIP/HTTP signaling.

When a single PDP context is shared between media and signaling, PoC proposes some QoS parameter settings that express a compromise between satisfying different transport requirements of signaling and voice media flows to ensure the best possible overall service quality for PoC. But using traffic class streaming does not fully solve the problem. The GPRS network cannot differentiate among the various types of frames within RTP packets and the stability of multiple streams cannot be guaranteed. Also, actual bandwidth in the GPRS network can fluctuate, making scheduling of packets important to ensure a good user experience.

Since even the best GPRS network is not able to guarantee any throughput to the UE, the PoC service quality can only be ensured if the radio access network is appropriately dimensioned. The following configurative means are available to improve the performance of the PoC service:

Radio channels can be assigned exclusively to PS data traffic (to avoid pre-emption by CS flows).

The maximal number of PS users multiplexed on the same timeslot (separate for UL and DL) can be limited.

The weight assigned to the priority level (related to the Precedence Class parameter value) of the PoC flow can be augmented.

UDP/IP header compression (RFC2507) can be configured to reduce the required radio link capacity.

If the underlying access network supports traffic class streaming, the secondary PDP context is to be-used for the media (voice) flows of the PoC application. In addition, the following configurative means are available to improve the performance of the PoC service:

UDP/IP header compression (RFC2507) or RTP/UDP/IP header compression (RFC3095) can be configured to reduce the required radio link capacity.

Delayed release of DL Temporary Block Flows (TBFs) and Extended TBF Mode in UL (available for 3GPP Release 4 compliant networks only) can be configured to preserve the TBF over a longer period of time.

In sum, where PTT applications operate in a limited bandwidth environment such as cellular networks, when signaling packets are transmitted at the same time as data packets, voice quality is diminished resulting in a poor user experience regardless of the type of packet compression in use. The present invention addresses the problem through effective scheduling of data and signaling packets for PTT applications, such as PoC, operating in limited bandwidth environments.

PoC is discussed in greater detail in the following technical specifications which are incorporated by reference: *Push-to-talk over Cellular (PoC), Architecture, PoC Release 2.0*, V2.0.8 (2004-06); *Push-to-talk over Cellular (PoC), Signaling Flows—UE to Network Interface (UNI), PoC Release 2.0*, V2.0.6 (2004-06); and *Push-to-talk over Cellular (PoC) User Plane, Transport Protocols, PoC Release 2.0*, V2.0.8 (2004-06). Of note, Release 1.0 is also available from the PoC Consortium as well as an upcoming PoC standard from Open Mobile Alliance (OMA). All of these are generally considered native PoC standards. Subsequently, a UE (user equipment), such as a PoC enabled cellular phone, supporting either of these standards is called a native PoC client (or non-DVM client).

SUMMARY

The present invention advantageously provides for scheduling signaling and data packets during PTT sessions.

An exemplary embodiment of the invention includes a method for scheduling data packets and signaling packets during a push-to-talk session by detecting periods of silence in the talk-burst, inserting signaling packets between the data packets in the periods of silence in the talk-burst; and transmitting the signaling packets along with the data packets. In another aspect of this embodiment, downlink signaling packets are suspended during the push-to-talk session.

Advantages of this exemplary embodiment include an effective method for sending signaling and data packets for enhancing PTT user experience.

DESCRIPTION OF THE DRAWINGS

The foregoing and other features, aspects, and advantages will become more apparent from the following detailed description when read in conjunction with the following drawings, wherein.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to SIP and RTP Protocol but other protocols can be used in the invention. Likewise, reference is made to PoC applications, while other types of Voice Over IP (VOIP) can be used in the present invention. Also, reference is made to PTT calls, while the present invention can be applied to other types of VOIP calls.

A. Overview

The present invention is described in the exemplary context of PoC applications that use SIP signaling protocol and RTP for audio/video data transmissions. As discussed in the Background section, PoC may be implemented with or without traffic class streaming. The present invention is still beneficial when traffic class streaming is in use. With or without traffic class streaming, the PoC implementation of the preferred embodiment should work in an access network that delivers a throughput of 7.2 kbps or more and should support AMR 5.15 as the default codec. Table 1 below describes the bandwidth consumption required for AMR 5.15 with ROHC compression and without ROHC compression.

An AMR-NB (Adaptive Multi Rate-Narrow Band speech codec) is used to compress the toll quality speech (8000 samples/second). This speech coder is mainly used for speech compression in the 3rd generation mobile telephony. This codec has eight basic bit rates, 12.2, 10.2, 7.95, 7.40, 6.70, 5.90, 5.15, and 4.75 Kbit/s. This codec works on the principle of Algebraic Code Excited Linear Prediction (ACELP) for all bit rates. To reduce average bit rate, this codec supports the discontinuous transmission (DTX), using Voice Activity Detection (VAD) and Comfort Noise Generation (CNG) algorithms. The eight AMR codec bit-rates (modes) are denoted with indices 0 to 7 where 0 maps to 4.75 kbit/s mode and 7 maps to 12.2 kbit/s mode.

AMR is discussed in greater detail in the following technical specifications: TS 26.090: "AMR Speech Codec; Speech Transcoding Functions", TS 26.093: "AMR Speech Codec; Source Controlled Rate Operations", and TS 26.092: "AMR Speech Codec; Comfort Noise Aspects."

TABLE 1

Bandwidth Consumption for AMR5.15

| Number of frames per RTP packet | Bandwidth consumption [kbps] AMR5.15, IPv4, No ROHC | Bandwidth consumption [kbps] AMR5.15, IPv4, ROHC |
| --- | --- | --- |
| 1 | 22.0 | 7.2 |
| 2 | 13.8 | 6.4 |
| 3 | 11.1 | 6.1 |
| 4 | 9.7 | 6.0 |
| 6 | 8.3 | 5.9 |
| 8 | 7.7 | 5.8 |
| 12 | 7.0 | 5.7 |
| 16 | 6.6 | 5.7 |

Table 1 displays the number of frames per packet for the various bandwidth amounts for the AMR5.15 codec with and without robust header compression (ROHC). As shown above, in most cases, wireless systems will put 12 to 16 frames per RTP packet for a throughput of 7.2 kbps (minimum required by PoC) without ROHC compression, but there can be as few as 1 frame per RTP packet for the same throughput if using ROHC compression. This specification uses the example of 12 frames per RTP packet in describing the invention as this represents the most widely used setting.

The PoC system establishes the AMR RTP payload attributes and mode-set when the PTT session is created. This determines how many frames will actually be packaged into each RTP packet during the PTT session. The system preferably supports the default codec, AMR5.15 and also other AMR modes if possible. The mode-set may be re-negotiated during a PTT session. This allows a change in the number of frames per RTP packet if more bandwidth becomes available. The AMR payload format should use the octet-aligned mode (byte aligned) without interleaving and without CRCs. The AMR parameters that are negotiated in the PTT session establishment are mode-set, ptime, maxptime, and octet-aligned. The maximum amount of media that can be encapsulated in a payload packet is signaled by the UE 10 by using the 'maxptime' parameter and is expressed as time in milliseconds. The 'maxptime' value takes into account any network delays. After SDP negotiation, the decoding UE 10 is able to unpack RTP packets containing any number of frames up to 'maxptime'.

The amount of media that is encapsulated in a payload packet is signaled by the 'ptime' value. The value is determined by the number of frames per RTP packet multiplied by 20 ms per frame to give the interval in milliseconds that represents the amount of media which can be encapsulated in an RTP payload packet. During the talk session, the UE 10s are able to accept SDP re-negotiations of 'ptime' up to the negotiated 'maxptime'. The encoding UE 10 may pack fewer frames into the last RTP packet of the talk burst, regardless of what has been defined during session negotiation or adaptation.

The AMR codec mode used for encoding each frame is signaled with the Frame Type (FT) index in the payload table of contents. Below, Table 2 defines the various Frame Types found in RTP packets.

TABLE 2

Frame Types

| | Frame Type | Mode Indication | Mode Request | Frame content (AMR mode, comfort noise, or other) | # of bits in Frame Type | # of Bits in AMRCore Frame | # of Bits in Bit Stuffing | # of octets |
| --- | --- | --- | --- | --- | --- | --- | --- | --- |
| | 0 | 0 | 0 | AMR 4.75 kbit/s | 4 | 95 | 5 | 13 |
| GPRS | 1 | 1 | 1 | AMR 5.15 kbit/s | 4 | 103 | 5 | 14 |
| | 2 | 2 | 2 | AMR 5.90 kbit/s | 4 | 118 | 6 | 16 |
| EDGE | 3 | 3 | 3 | AMR 6.70 kbit/s (PD EFR) | 4 | 134 | 6 | 18 |
| | 4 | 4 | 4 | AMR 7.40 kbit/s (TDMA-EFR) | 4 | 148 | 0 | 19 |
| | 5 | 5 | 5 | AMR 7.95 kbit/s | 4 | 159 | 5 | 21 |
| | 6 | 6 | 6 | AMR 10.2 kbit/s | 4 | 204 | 0 | 26 |
| 3G | 7 | 7 | 7 | AMR 12.2 kbit/s (GSM-EFR) | 4 | 244 | 0 | 31 |

Mostly Likely Choice for these Networks

TABLE 2-continued

Frame Types

| | | | | | | | | |
|---|---|---|---|---|---|---|---|---|
| Silence Frames | 8 | – | – | AMR SID | 4 | 39 | 5 | 6 |
| | 9 | – | – | GSM-EFR SID | 4 | 43 | 1 | 6 |
| | 10 | – | – | TDMA-EFR SID | 4 | 38 | 6 | 6 |
| | 11 | – | – | PDC-EFR SID | 4 | 37 | 7 | 6 |
| | 12-14 | – | – | For future use | – | – | – | – |
| No Data Frame | 15 | – | – | No Data (No transmission/No reception) | 4 | 0 | 4 | 1 |

In the table above, the Frame Types 0 to 7 are the frame types for speech bits and Frame Types 8 to 11 are comfort noise frames (silence frames). Frame Type 15 is a No Data frame. Different networks will use different Frame Types. For example, a GPRS network is likely to use Frame Type 1, an Edge network is likely to use Frame Type 3 or 4, and a 3G network is likely to use Frame Type 7.

Figure 2A:
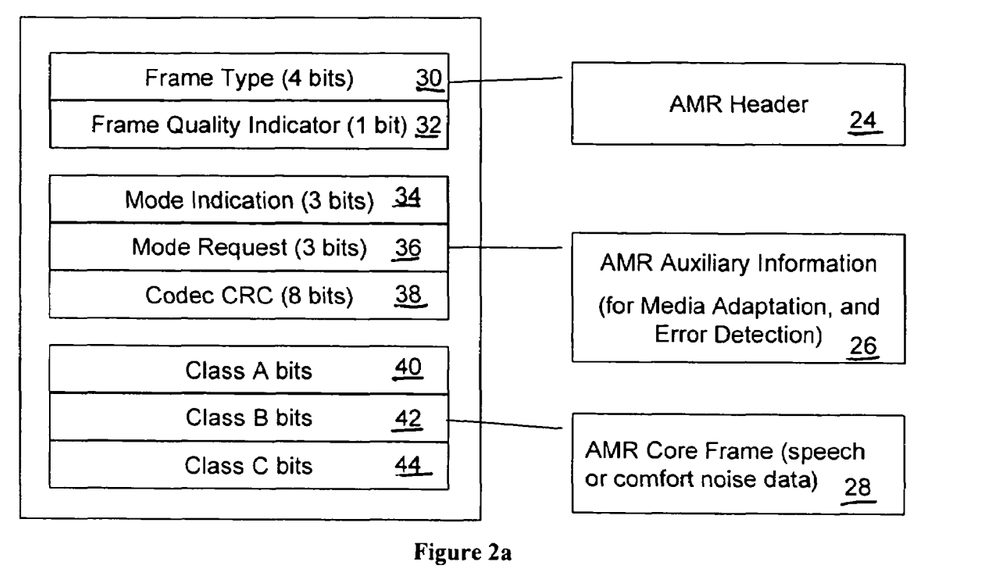
FIG. 2a is a block diagram illustrating an AMR frame decoded in bit aligned frame form.
Figure 2B:
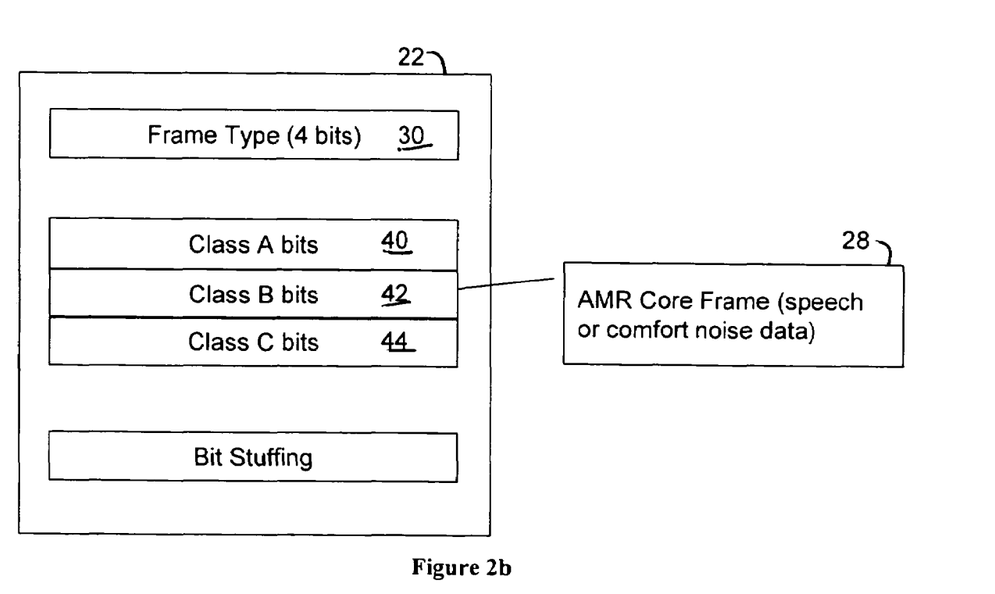
FIG. 2b is a block diagram illustrating an AMR frame decoded in byte aligned frame form.

The AMR frame can be decoded into one of two forms: 1) bit aligned frame 20 or 2) byte aligned frame 22. FIG. 2a illustrates the parts of an AMR frame in the bit aligned format. FIG. 2b illustrates the parts of an AMR frame in the byte aligned format. The frame parts shown in FIG. 2b are the same as those shown in FIG. 2a.

FIG. 2a shows the generic frame format for both the speech and comfort noise frames of the AMR speech codec. This format is referred to as AMR interface format 1 (AMR IF1). The frame is divided into three parts: AMR header 24, AMR Auxiliary information 26, and AMR core frame 28. The AMR header 24 includes the Frame Type 30 and the Frame Quality Indicator fields 32. The AMR auxiliary information 26, used for mode adaptation and error correction, includes the Mode Indication 34, Mode Request 36, and Codec CRC fields 38. The AMR core frame 28 consists of the speech parameter bits, or in case of a comfort noise frame, the comfort noise parameter bits. Inn the case of a comfort noise frame, the comfort noise parameters replace Class A bits 40 of the AMR core frame while Class B bits 42 and Class C bits 44 are omitted.

The data content (comfort noise bits) of the additional frame types is carried in the AMR core frame 28. The comfort noise bits are all mapped to Class A bits 40 of AMR Core Frame 28 and Classes B bits 42 and C bits 44 are not used. This is a notation for convention only and the class division has no meaning for comfort noise bits. Below, Table 3 denotes the number of bits in each of the three areas of the AMR Core Frame 28 for the first eight Frame Types: Frame Types 0 to 7.

TABLE 3

Number of bits in Classes A, B, and C for each AMR codec mode

| Frame Type | AMR codec mode | Total number of bits | Class A | Class B | Class C |
|---|---|---|---|---|---|
| 0 | 4.75 | 95 | 42 | 53 | 0 |
| 1 | 5.15 | 103 | 49 | 54 | 0 |
| 2 | 5.90 | 118 | 55 | 63 | 0 |
| 3 | 6.70 | 134 | 58 | 76 | 0 |
| 4 | 7.40 | 148 | 61 | 87 | 0 |
| 5 | 7.95 | 159 | 75 | 84 | 0 |
| 6 | 10.2 | 204 | 65 | 99 | 40 |
| 7 | 12.2 | 244 | 81 | 103 | 60 |

As shown in table 3 above, for the Frame Types 0 to 7, there are bits found in all three classes in varying amounts and ratios. Several Frame Types do not have bits in Class C bits 44, but all of these Frame Types utilize Class B bits 42. This is not true of AMR comfort noise bits (Frame Type 8). Frame Type 8 is the basic silence frame type. When a silence frame follows a data frame it is called SID_FIRST and when a silence frame follows a No Data frame it is called SID_UPDATE. The contents of SID_UPDATE and SID_FIRST are divided into three parts: SID Type Indicator STI), Mode Indication (mi(i)), and Comfort Noise Parameters (s(i)). In the case of SID_FIRST, the Comfort Noise Parameters bits (s(i)) are set to "0". A SID (Silence Insertion Descriptor) represents the start of a silence packet. A SID frame can also represent continued silence. Below, Table 4 shows the number of bits in each of the three areas of the AMR Core Frame 28 for the Type 8 Silence frame.

TABLE 4

Bit classification for Frame Type 8 (AMR SID)

| | | | Class A | | | | |
|---|---|---|---|---|---|---|---|
| Frame Type Index | FQI | AMR TX_TYPE or RX_TYPE | Total no. of bits | SID Type Indicator (STI) | Mode Indication mi(i) | Comfort Noise Parameter s(i) | Class B | Class C |
| 8 | 1 | SID_UPDATE | 39 | 1 (="1") | 3 | 35 | 0 | 0 |
| 8 | 1 | SID_FIRST | 39 | 1 (="0") | 3 | 35 (="0") | 0 | 0 |
| 8 | 0 | SID_BAD | 39 | 1 | 3 | 35 | 0 | 0 |

The comfort noise parameter bits produced by the AMR speech encoder are denoted as $s(i)=\{s(1),s(2),\ldots,s(35)\}$. These bits are numbered in the order the AMR encoder produces them without any reordering. These bits are followed by the SID Type Indicator (STI) and the Mode Indication The preferred embodiment of the present invention schedules the transmission of signaling packets during a PTT session based upon the silence frames within the talk-burst. This is feasible since silence frames are smaller in size than voice data frames. The small size of silence frames provides time to send signaling packets. Silence in the talk-burse is the result of pauses in speech when the speaker is taking a breath, collecting thoughts and the like.

In aspect of the preferred embodiment, a Scheduling Mechanism 46 in the UE 12 captures all incoming and outgoing packets and schedules them to give priority to RTP packets (voice, media) to optimize user experience. This Scheduling Mechanism 46 operates on several levels within the PoC System 48. It can schedule when packets are sent in general and also activate a Silence Detector 88 (shown in FIG. 7) that will detect moments of silence within a PTT session where signaling packets can also be sent. This scheduling results in optimum efficiency of the PoC System 48 and enhances user experience. Additionally, another aspect of the preferred embodiment manages downstream SIP packets by preventing the transmission of SIP packets to the user during PTT sessions.

B. Architecture

Figure 3:
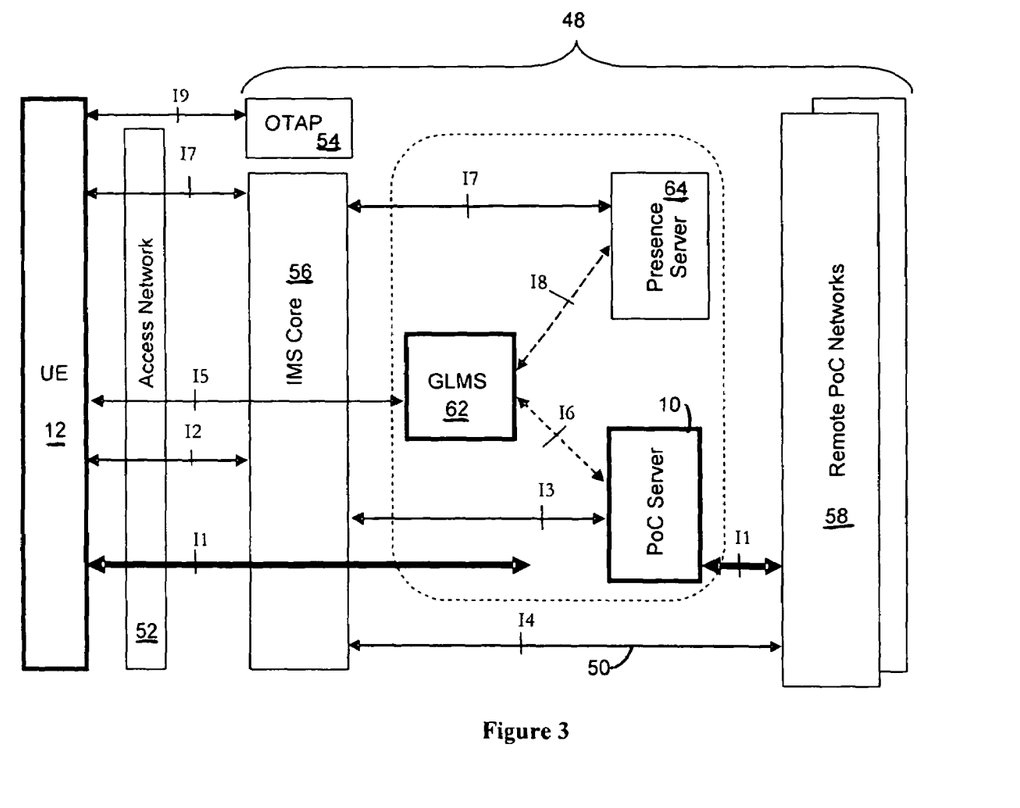
FIG. 3 is a combination block diagram and flow chart illustrating messages sent between the UE and the PoC System.

FIG. 3 illustrates system 50 of the preferred embodiment as well as the interfaces for messages transmitted between the UE 12 and various components of the PoC system 48. System 50 includes UE 12, access network 52, Over the Air Provisioning Server (OTAP) 54, IMS Core 56, PoC Servers 10, and remote PoC networks 58. Access Network 52 is the communications network for connecting UE 12 to the PoC System 48. In the case of a PoC System 48 (i.e., PTT-over-cellular), the Access Network 52 is a cellular network. The OTAP Server 54 performs the following functions that are needed in support of the PoC Service: provides all the needed configuration parameters from the service provider network for a PoC Client (i.e., UE 12), and sends a WAP-push/SMS containing a binary coded XML to every client UE 12 with default factory and network settings.

The PoC services 60 include Group List Management Server (GLMS) 62, PoC Server 10, and Presence Server 64. As would be obvious to those of ordinary skill in the art, the PoC services 60 may be implemented in a single physical server, in multiple physical servers for each function, or any combination thereof.

Below, Table 5 defines the message types associated with the nine interfaces shown in FIG. 3.

TABLE 5

File Types Sent in PoC System

| No. | Interface | Message Type |
|---|---|---|
| 11 | Floor Control and media | RTP Media and RTCP Floor control and QoS |
| 12 | PoC Client to Proxies Session Signaling | SIP Register, Re-register, Invite, Update, Subscribe, Notify, Bye, Cancel, Message, Publish, Responses (e.g., 200OK) |
| 13 | Proxy to PoC Server Session Signaling | SIP Invite, Update, Subscribe, Notify, Bye, Cancel, Message, Responses (e.g., 200OK) |
| 14 | Proxy to Proxy Session Signaling | SIP Invite, Update, Subscribe, Notify, Bye, Cancel, Message, Presence Publish, Presence Subscribe, Presence Notify, Responses (e.g., 200OK) |
| 15 | Group Mgmt to PoC Client | HTTP GET, PUT, SIP XCAP Subscribe, XCAP Notify |
| 16 | Group Mgmt to PoC Server | HTTP GET, PUT, SIP XCAP Subscribe, XCAP Notify |
| 17 | Presence Status | SIP Publish, Subscribe, Notify |
| 18 | Contact Lists | HTTP GET, PUT, SIP XCAP Subscribe, XCAP Notify |
| 19 | PoC Client configuration data | HTTP/syncXML of device bootstrap/configuration data |

Figure 4:
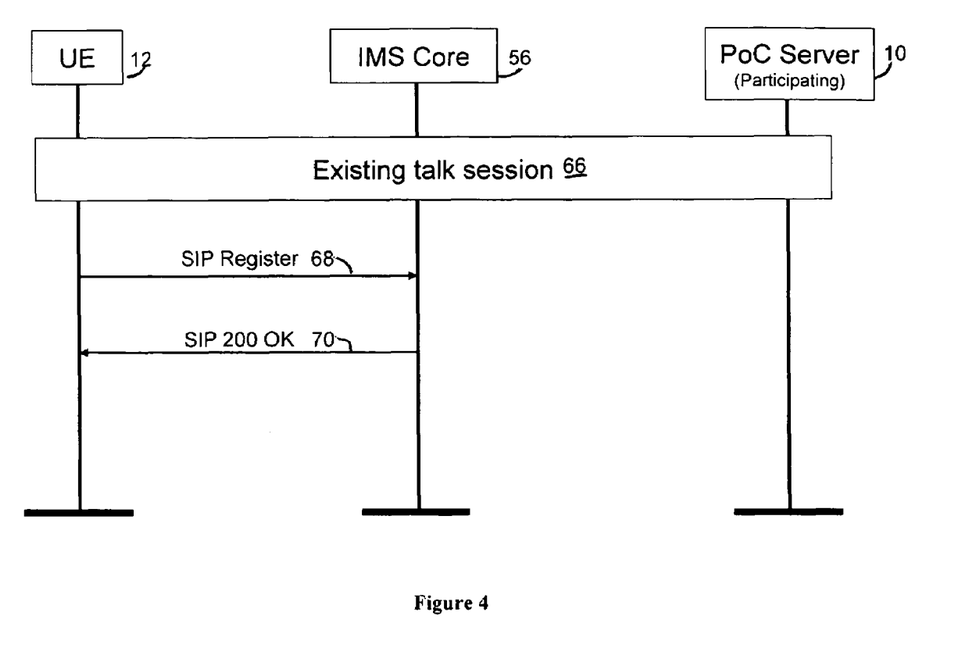
FIG. 4 is a data flow diagram illustrating the flow of SIP packets sent during a PTT Session in the preferred embodiment.

The message types listed above are sent at various times to and from the PoC server 10 and the UE in response to user action on UE 12. FIG. 4 shows an example of the types of SIP packets that would be exchanged during a typical PTT conversation.

SIP Register messages 68 would be sent by the handset during an existing PTT Conversation 66 to alert the PoC Server 10 that the talk session is still active. The PoC Server 10 responds by sending down SIP 200 OK messages 70 to the UE 12. Other examples of SIP packets that need to be sent during talk bursts include invitations to 3$^{rd}$ parties to join an existing Talk Session 66, negotiation of new AMR rates, exchanges of signaling during Talk Sessions 66, and registration messages sent to the IMS Core 56. The scheduling function takes into account network characteristics, such as a higher-rate AMR codec on EDGE, when making the calculation in the scheduler if a SIP packet is sent or not, or if the silence detection function is even on or off.

C. Scheduling Process

Figure 5:
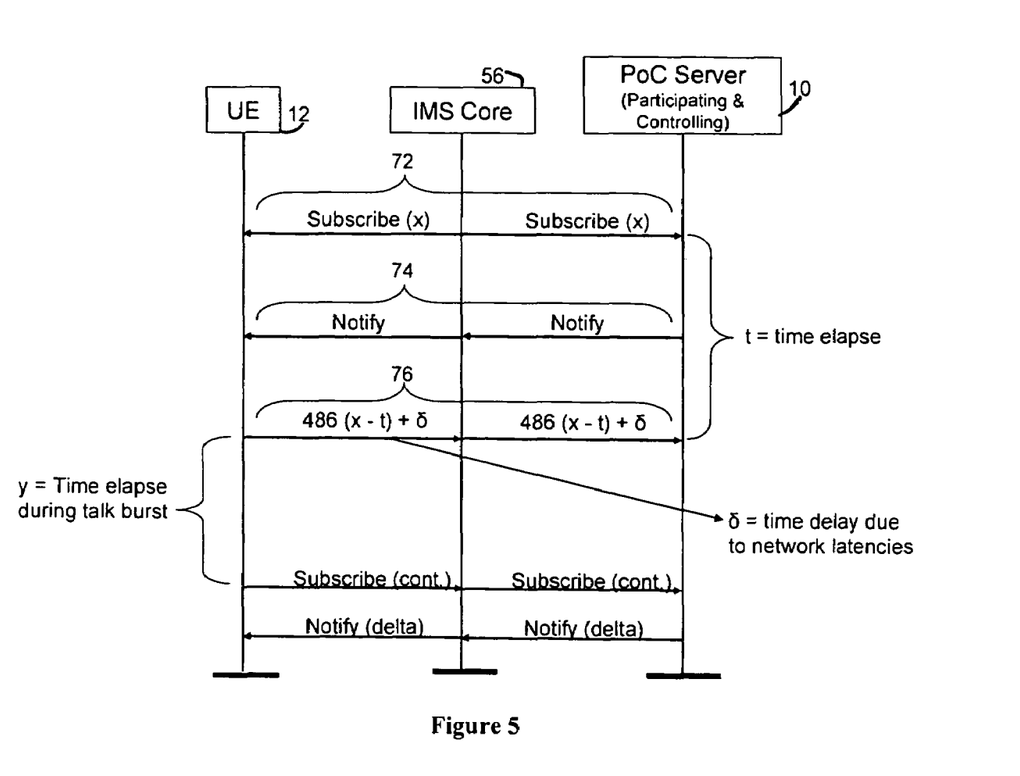
FIG. 5 is a data flow diagram illustrating the flow of messages during downlink message suspension in the preferred embodiment.

One example of the scheduler function is the ability to suspend the sending of messages down from the PoC Server 10 to the UE 12. This is important because these SIP messages can disrupt the talk bursts being created during a PTT session and cause call quality to worsen. FIG. 5 shows the sequence of message sent to and from the PoC Server 10 and the point at which the downlink messages from the server can be shut off during a PTT session. As shown, System 50 utilizes a 486 message originated by Scheduling Mechanism 46 to suspend downlink messages during a PTT session As shown in FIG. 5, a PTT session is initiated by a series of SIP messages: Subscribe 72 and Notify 74. UE 12 then sends the 486 message 76 to the PoC Server 10 (either participating 14 or controlling 16) via IMS Core 56. As a result, all messages coming downlink from the PoC Server 10 are suspended for a time period (y) defined in the parameter associated with the 486 message. Time period (y) is determined based upon the following formula: $y=(x-t)+\delta$ where x is the total subscription time for the current SIP session, t is the time elapsed before sending the 486 message, and $\delta$ is the time delay for the 486 message to travel over the network to the PoC Server 10. By calculating y in this fashion, the client ensures that the SIP session will not be terminated and, as such, can always avoid a complete new download of a contact list. Notify messages only include deltas from the first downloaded contact list and are small in size. During that time, no SIP messages are sent downlink from the PoC Server 10 to the UE 12. This frees up bandwidth for SIP messages to be sent uplink from the UE 12 to the PoC Server 10. Typically, messages coming downlink are of the Request type and those flowing uplink are Responses during a talk burst. The scheduling mechanism 46 puts priority on sending Response type messages over Request type messages. So halting the downlink flow during a talk session enables the Scheduling Mechanism 46 to minimize disruption of the talk burst with large Request type messages coming down to the UE 12 during a PTT session, leaving the bandwidth free for RTP packets and Response type signaling packets.

Figure 6:
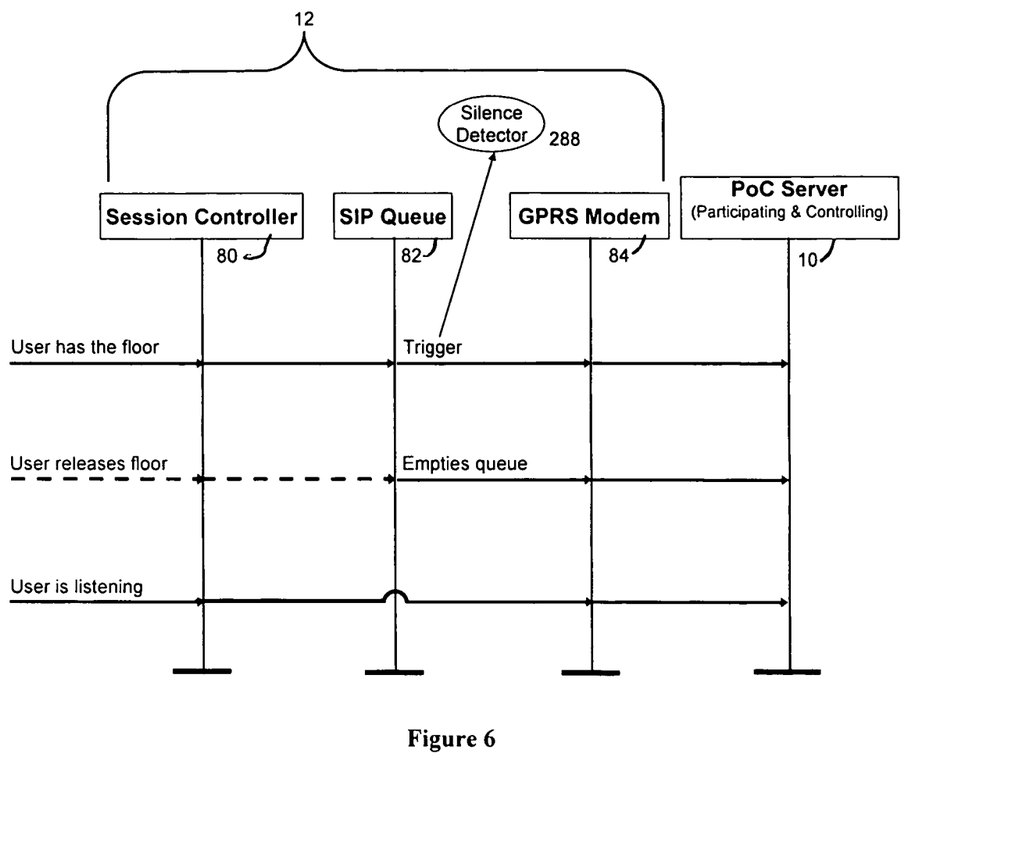
FIG. 6 is a data flow diagram illustrating the flow of messages in the preferred embodiment during SIP messaging with a floor control change.
Figure 7:
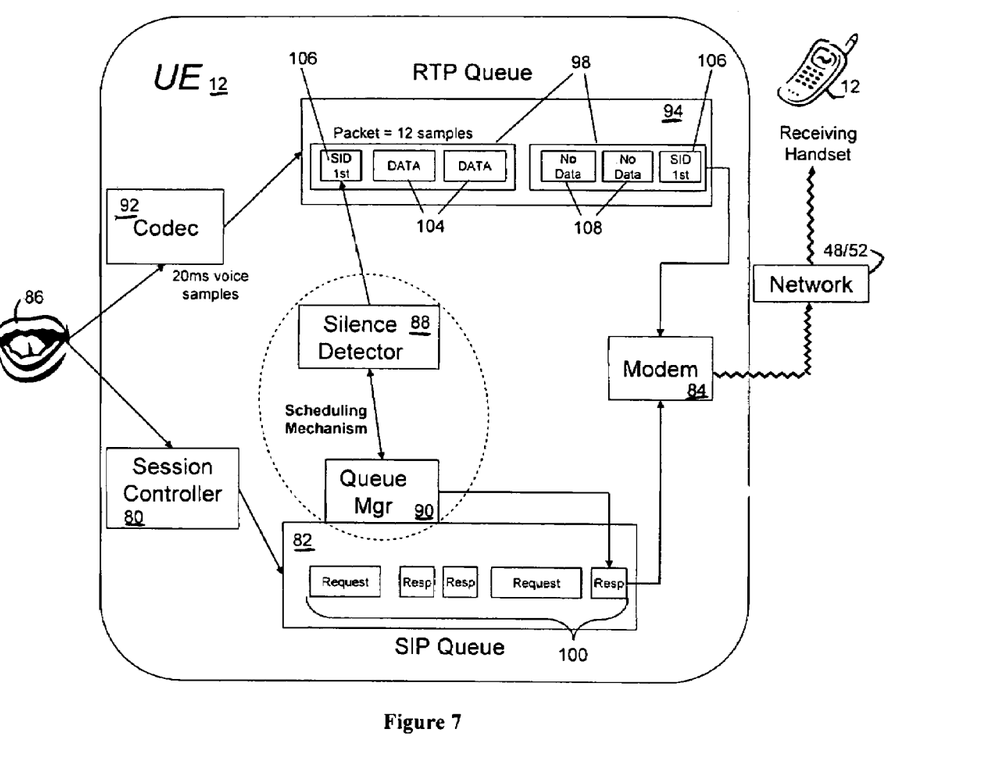
FIG. 7 is a combination block diagram and flow chart illustrating the process flow using the silence detector of the preferred embodiment.

FIG. 6 shows the message flow within UE 12 (in particular, Session Controller 80, SIP Queue 82, and Modem 84, all of which are described in more detail with respect to FIG. 7) and between UE 12 and PoC Server 10 during a PTT session when floor control changes on the UE 12. During the Talk Burst 86 when the user has the floor, the UE 12 sends packets up to the PoC Server 10. When SIP Queue 82 receives SIP packets 100 from Session Controller 80, Queue Manager 90 sends a triggering message to Silence Detector 88 (shown and described in detail with respect to FIG. 7). In response to the trigger, Silence Detector 88 monitors the RTP queue for Silence Frames 106 and No Data Frames 108.

When the user releases floor control, the queue 82 holding all the signaling messages empties and those messages are immediately sent up to the PoC Server 10. In cases where the user is listening to a talk burst 86 the signaling messages go directly to the PoC Server 10, bypassing the queue 82.

Preferably, the SIP signaling queue 82 is only utilized while the user is speaking. That is when scheduling is most vital. When the user is listening, scheduling typically is not an issue as no RTP packets 98 are flowing from the UE 12. When the user is speaking during a PTT session, the scheduling mechanism 46 detects moments of silence within the talk burst 86 and then schedules SLP packets 100 during that silence. As bandwidth in wireless systems is precious, priority is always given to RTP packets 98, which contain the speech elements of the talk burst 86. In the case of limited time slots in a channel, SIP packets 100 are scheduled properly with minimum interlacing with RTP packets 98 to optimize talk burst quality.

FIG. 7 displays the stages of a PTT session where silence detection is being utilized to determine when SIP packets 100 can be sent during a talk burst 86 with respect to the scheduling mechanism 46 within UE 12 and the access network 52 and PoC System 48. Scheduling mechanism 46 is included, along with other standard components well known to those of ordinary skill in the art, within UE 12. Scheduling mechanism 46 includes silence detector 88 and SIP queue manager 90, and is preferably software embedded in the chipset of UE 12, although scheduling mechanism 46 may be implemented in other hardware and/or software configurations. Other components within UE 12, standard in a PoC capable UE 12, include codec 92, RTP Queue 94, session controller 80, SIP queue 82 and modem 84 (e.g., GPRS or the modem type required for the particular type of access network 52).

RTP packets 98 and SIP packets 100 are transmitted by GPRS modem 84 to the PoC System 48 via access network 52. Ultimately, the RTP packets 98 and, as appropriate, the SIP packets 100 are received by other UE 12 participating in the PTT session via access network 52.

Additionally, FIG. 7 illustrates the uplink message process during a PTT session, utilizing Silence Detector 88 to determine the proper time when SIP packets 100 can be sent to maximize the voice quality of a talk burst 86. There are five stages to this process that are explained in detail with respect to FIG. 7.

Step 1: The talk burst 86 is initiated by one user to another. This causes information to be sent to the Codec 92 and to the Session Controller 80. The Codec 92 receives the speech data as the user speaks into the UE 12. The Session Controller 80 receives commands to send out various SIP packets 100.

Step 2: RTP packets 98 and SIP packets 100 are created and sent to their corresponding queues, RTP Queue 94 and SIP Queue 82, respectively. The Session Controller 80 creates the SIP packets 100 and the Codec 92 creates the RTP packets 98. The RTP packets 98 contain voice samples that are each 20 ms in length. There are 12 voice samples (i.e., frames) per packet.

Step 3: The Silence Detector 88 analyzes the RTP packets 98 for Silence frames 106 and No Data frames 108 every 20 milliseconds. The Silence Detector 88 determines when SIP packets 100 can be sent out during RTP packets 98 that contain Silence frames 106 and No Data frames 108.

Step 4: The Silence Detector 88 sends messages to the SIP Queue Manager 90 to start sending SIP packets 100 when silence is detected. The SIP Queue Manager 90 communicates back to the Silence Detector 88 after sending each SIP packet 100 to determine if more SIP packets 100 can be sent. If the Silence Detector 88 sees more No Data frames 108, the Queue Manager 90 will send out another SIP packet 100 from SIP Queue 82.

Step 5: The SIP Queue Manager 90 causes SIP packets 100 to be sent to the Modem 84 in response to commands from the Silence Detector 88. Priority is given to Response messages and then Request messages since Response messages are smaller and are more time-sensitive. Other secondary prioritizations can include active vs. dormant, first in first out, domestic vs. international, session type, etc. The system implementer can determine this secondary prioritization.

The process described above assumes that PoC has been implemented according to the PoC specifications using the AMR codec. The silence detector 88 tracks Frame Types 8 to 15 and alerts the Queue Manager 90 when those frame types appear. Below, Table 6 shows the details arts of the various Silence and No Data Frame Types.

TABLE 6

Silence Frame Types

| Frame Type | Mode Indication | Mode Request | Frame content | # of bits in Frame Type | # of Bits in AMR Core Frame | # of Bits in Bit Stuffing | # of octets |
|---|---|---|---|---|---|---|---|
| 8 | — | — | AMR SID | 4 | 39 | 5 | 6 |
| 9 | — | — | GSM-EFR SID | 4 | 43 | 1 | 6 |
| 10 | — | — | TDMA-EFR SID | 4 | 38 | 6 | 6 |
| 11 | — | — | PDC-EFR SID | 4 | 37 | 7 | 6 |
| 12-14 | — | — | For future use | — | — | — | — |
| 15 | — | — | No Data (No transmission/No reception) | 4 | 0 | 4 | 1 |

As shown above, frame types 8-15 contain at most 6 octets each and No Data frames 108 contain only 1 octet each. The small size of these frame types can be trigger points to send SIP packets 100. In general, No Data Frames 108 follow a SID frame and effectively bandwidth is not used at that time. That is the ideal time to send SIP packets 100.

Figure 8:
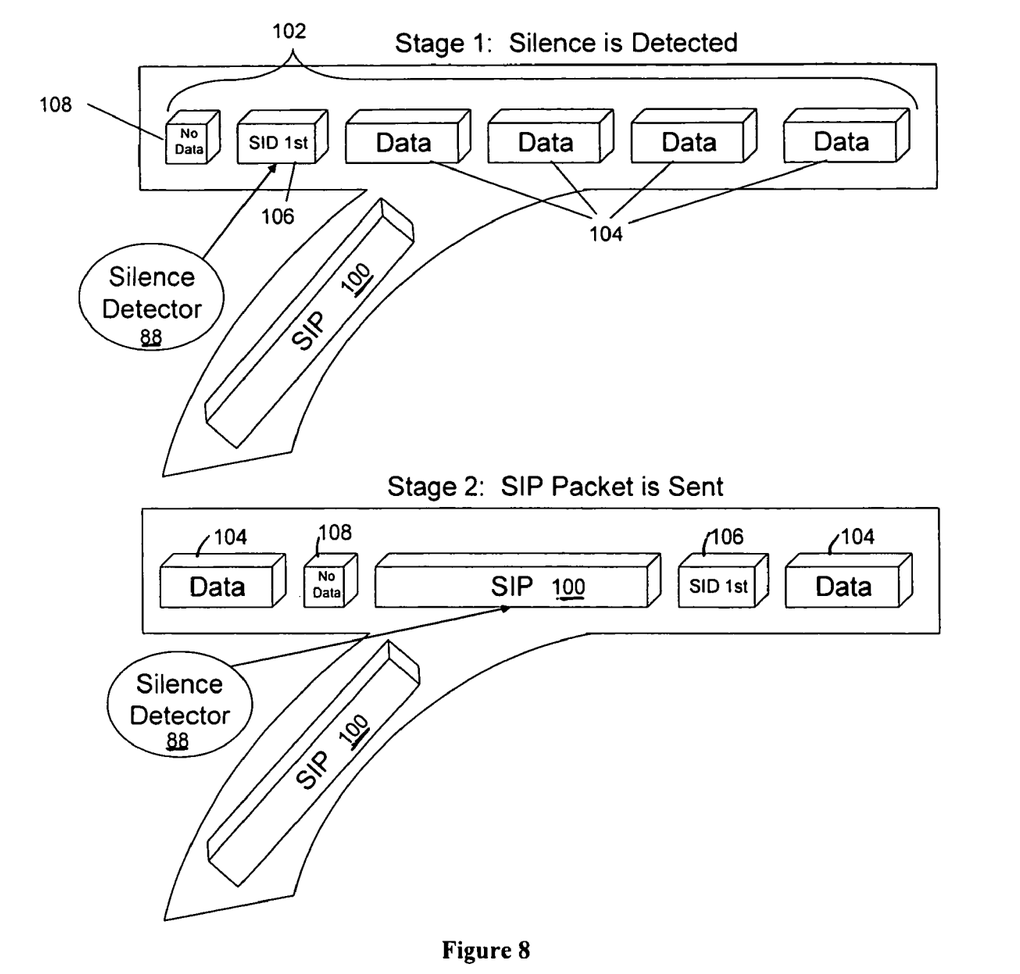
FIG. 8 is a block diagram illustrating the trigger mechanism of the preferred embodiment.

When the silence detector 88 sees a SID_FIRST frame 106 (as previously explained, a silence frame that follows a data frame 104), it alerts the Queue Manager 90 to send a SIP packet from SIP Queue 82. The SIP packet 100 is then inserted behind the SID_FIRST frame 106 as shown in FIG. 8. FIG. 8 illustrates the Silence Detector 88 triggering the sending of a SIP packet 100 upon detecting silence (e.g., SID_FIRST frame 106) and no data frames 108.

As shown in FIG. 8, the SIP packet 100 is inserted after the SID_FIRST frame 106. This optimizes speech quality as no speech packets are delayed or lost with this scenario. Delaying the No data/silence packets does not effect how the listener perceives the speech coming through the handset, but delaying speech packets would result in choppiness or the loss of words or syllables. Assuming the network is using AMR5.15 with mode 1, there is a bandwidth of 8 kbits/second over which to send packets, and packets are sent every 240 ms. In a RTP packet 98 containing all voice frames, with 12 frames in the packet, the average speech packet takes approximately 200 ms to go out to the network. This figure is calculated by adding up the number of header bytes in the packet (IP header 20 bytes+UDP header 8 bytes+RTP header 12 bytes) to the number of frame bytes (12 frames×14 bytes/frame=168 bytes) to achieve 208 total bytes. Then those 208 bytes are multiplied by 8 bits/byte and divided by 8 kbits/second to provide approximately 200 ms per packet.

When a RTP packet 98 of 200 ms is sent across the network, only 40 ms are free to send SIP packets 100, which is not enough time to allow for the SIP packet 100 to go through before the next speech packet is sent. The average silence frame could only take 40-60 ms to go out to the system, freeing 200 ms to send SIP packets 100, and if multiple silence and no data frames appear in a row, there is even more free time to insert SIP packets 100 without delaying any speech packets.

Another way to maximize voice quality during a PTT session is by determining the real-time bandwidth and altering the ptime accordingly. This can be done with the use of triggers in the RTP packets 98 and SIP packets 100 that instigate a response message from the access network 52 back to the SIP Queue Manager 90 which calculates the real-time bandwidth and communicates with the Session Controller 80 to change the ptime or send out SIP packets 100. The triggers involved are placed in the header of the packet and provide a unique ID number for each packet. For example, the trigger might be modified TOS bits in the IP header or a modified API to lower layers. The trigger causes the GPRS modem 84 to send a message back that includes this unique ID number and a time stamp. The Queue Manager 90 can calculate the bandwidth using the known size of the packet and the time stamp information from the Access Network 52 that indicates how long it took for the message to be delivered over Access Network 52. Once the bandwidth is calculated, the Queue Manager 90 reacts by sending more SIP packets 100 or alerting the Session Controller 80 to change the ptime to respond to better or worse bandwidth conditions.

D. Conclusion

Having disclosed exemplary embodiments and the best mode, modifications and variations may be made to the disclosed embodiments while remaining within the subject and spirit of the invention as defined by the following claims.

I claim:

1. In a communications network, a method for scheduling data packets and signaling packets for a client device coupled to the communications network during a Voice Over Internet Protocol (VOIP) session, comprising the steps of:

detecting a period of silence data in a talk-burst by a silence detector;

inserting a signaling packet between data packets during the period of silence in the talk-burst by a signaling queue manager, wherein the data packets are transmitted using a data protocol, wherein the data packets are based upon Real-time Transport Protocol (RTP) and the signaling packets are based upon Session Initiation Protocol (SIP), and wherein the detecting step detects the period of silence when a first silence descriptor (SID_FIRST) data packet is a data packet in the talk-burst: and wherein the inserting step inserts the signaling packet behind the SID_FIRST data packet;

transmitting the signaling packet using a signaling protocol between the client device and the communications network; and determining the time between a packet equipped with a trigger is released to a communications network modem and a control message is received in response to the trigger packet being transmitted out on the communications network by the signaling queue manager;

calculating real-time bandwidth of the communications network by the signaling queue manager; and based upon the real-time bandwidth, modifying the size of the signaling packets by a session controller.

2. The method recited in claim 1, further comprising the step of:

suspending downlink signaling packets to the client device during the VOIP session.

3. The method recited in claim 2, wherein the suspending step transmits a 486 message using SIP dialogue in reaction to start of a VOIP session, start of the talk burst, or start of transmission of an RTP packet.

4. The method recited in claim 3, wherein the suspension time is calculated so that the SIP dialogue remains active.

5. The method recited in claim 3, wherein a new SUBSCRIBE message is sent within the SIP dialogue at termination of the VOIP session, termination of the talk burst, or conclusion of transmission of an RTP packet.

6. The method recited in claim 1, further comprising the steps of:

determining the time between a packet equipped with a trigger is released to a communications network modem and a control message is received in response to the trigger packet being transmitted out of the communications network;

calculating real-time bandwidth of the communications network; and based upon the real-time bandwidth, transmitting a second signaling packet.

7. The method recited in claim 1, further comprising the steps of:

emptying signal packets stored in the client device; and bypassing the detecting and inserting steps when the client device releases floor control.

8. The method recited in claim 1, wherein the VOIP session is a push-to-talk session.

9. An improved push-to-talk enabled client device, the improvement comprising:

means for detecting a period of silence in a talk-burst during a push-to-talk session, wherein the means for detecting detects the period of silence based upon a silence data packet present in the talk burst, and wherein the silence data packets detected by the silence detector are first Silence Descriptor (SID_FIRST) data packets;

means for inserting a signaling packet between data packets during the period of silence in the talk-burst during the push-to-talk session, wherein the signaling packets are transmitted using a signaling protocol and the data packet are transmitted using a data protocol, and wherein the data packets are based upon Real-time Transport Protocol (RTP) and the signaling packets are based upon Session Initiation Protocol (SIP);

means for determining the time between a packet equipped with a trigger is released to a push-to-talk network modem and a control message is received in response to the trigger packet being transmitted out on the push-to-talk network;

means for calculating real-time bandwidth of the push-to-talk network; and means for modifying the size of the signaling packets based upon the real-time bandwidth.

10. The device recited in claim 9, wherein means for inserting inserts the signaling packet behind the silence data packet in the talk-burst.

11. The device recited in claim 9, further comprising:

means for suspending downlink signaling packets during the push-to-talk session.

12. The device recited in claim 11, wherein the means for suspending generates a 486 Message using SIP.

13. The device recited in claim 9, further comprising:

means for determining the time between a packet equipped with a trigger is released to a push-to-talk network modem and a control message is received in response to the trigger packet being transmitted out on the push-to-talk network;

means for calculating real-time bandwidth of the push-to-talk network; and means for transmitting a second signaling packet based upon the real-time bandwidth.

14. The device recited in claim 9, further comprising:

means for disabling the means for detecting and means for inserting when the client device releases floor control.

15. A client device configured for use in a push-to-talk communications network, comprising:

a codec configured to create data packets representative of an input talk-burst, wherein the data packets are based upon Real-time Transport Protocol (RTP);

a data packet queue coupled to the codec for the data packets;

a session controller configured to create signaling packets, wherein the signaling packets are based upon Session Initiation Protocol (SIP);

a signaling packet queue coupled to the session controller for the signaling packets, a silence detector to identify, in the data packet queue, data packets representative of silence in the talk-burst; and a signaling queue manager configured to control signaling packets output from the signaling packet queue, wherein, in response to the silence detector detecting a silence data packet, the signaling queue manager directs the signaling packet queue to output at least one of the signaling packets behind the silence data packet, wherein the silence data packets detected by the silence detector are first Silence Descriptor (SID_FIRST) data packets, wherein the signaling queue manager calculates real-time bandwidth of a push-to-talk network based upon the time between a packet equipped with a trigger is released to the push-to-talk network modem and a control message is received in response to the trigger packet being transmitted out of the push-to-talk network, and wherein the session controller modifies the size of the signaling packets based upon the real-time bandwidth.

16. The device recited in claim 15, further comprising:

means for suspending downlink signaling packets during the push-to-talk session.

17. The device recited in claim 16, wherein the means for suspending generates a 486 message using SIP.

18. The device recited in claim 15, further comprising:

wherein the signaling queue manager calculates real-time bandwidth of the push-to-talk network based upon the time between a packet equipped with a trigger is released to the push-to-talk network modem and a control message is received in response to the trigger packet being transmitted out of the push-to-talk network; and wherein the signaling queue manager directs the signaling packet queue to output at least one additional of the signaling packets behind the silence data packet.

19. The device recited in claim 15, wherein the signaling packets in the signaling packet queue are released without delay when the device releases floor control.

20. The device recited in claim 15, wherein the signaling packet queue and the silence detector are disabled when the device releases floor control.

* * * * *